(12) United States Patent
Lynch et al.

(10) Patent No.: US 11,947,505 B2
(45) Date of Patent: Apr. 2, 2024

(54) SYSTEMS AND METHODS FOR TRACKING DATA LINEAGE AND RECORD LIFECYCLE USING DISTRIBUTED LEDGERS

(71) Applicant: JPMORGAN CHASE BANK, N.A., New York, NY (US)

(72) Inventors: Arthur G. Lynch, Hamilton (GB); Zsolt Kalmar, New York, NY (US); Ashish Tiwari, Glasgow (GB); Robert Keith, Cardross (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 32 days.

(21) Appl. No.: 17/143,645

(22) Filed: Jan. 7, 2021

(65) Prior Publication Data

US 2021/0209079 A1 Jul. 8, 2021

Related U.S. Application Data

(60) Provisional application No. 62/958,586, filed on Jan. 8, 2020.

(51) Int. Cl.
*G06F 16/00* (2019.01)
*G06F 16/21* (2019.01)
(Continued)

(52) U.S. Cl.
CPC ........ *G06F 16/219* (2019.01); *G06F 16/2255* (2019.01); *H04L 9/0618* (2013.01); *G06F 16/252* (2019.01); *H04L 9/50* (2022.05)

(58) Field of Classification Search
None
See application file for complete search history.

(56) References Cited

U.S. PATENT DOCUMENTS

| 10,678,866 B1 * | 6/2020 | Ranganathan | G06F 40/197 |
| 2013/0054625 A1 * | 2/2013 | Bhagwan | G16H 10/60 |
| | | | 707/E17.014 |

(Continued)

OTHER PUBLICATIONS

International Search Report, dated Apr. 8, 2021, from corresponding International Application No. PCT/US2021/012795.

(Continued)

*Primary Examiner* — Hasanul Mobin
(74) *Attorney, Agent, or Firm* — GREENBERG TRAURIG LLP (57) ABSTRACT

Systems and methods for tracking data lineage and record lifecycle using a distributed ledger are disclosed. In one embodiment, a method for tracking record lifecycle events may include: (1) creating, by a record lifecycle tool, a recordable artifact for a record lifecycle event in a record lifecycle, the recordable artifact comprising data for the record lifecycle event; (2) generating, by the record lifecycle tool, a hash of the data; (3) creating, by the record lifecycle tool, record lifecycle event metadata for the recordable artifact; (4) signing, by the record lifecycle tool, the record lifecycle event metadata; (5) writing the record lifecycle event metadata to supply chain metadata storage at a storage location, wherein the supply chain metadata storage may be cryptographically verifiable and immutable; and (6) writing the hash and an identifier for the storage location in the supply chain metadata store to a present state database.

17 Claims, 3 Drawing Sheets

(51) Int. Cl.
*G06F 16/22* (2019.01)
*H04L 9/06* (2006.01)
*G06F 16/25* (2019.01)
*H04L 9/00* (2022.01)

(56) References Cited

U.S. PATENT DOCUMENTS

| | | | |
|---|---|---|---|
| 2014/0075004 A1* | 3/2014 | Van Dusen | G06F 16/90335 |
| | | | 709/223 |
| 2016/0253340 A1* | 9/2016 | Barth | G06F 16/122 |
| | | | 707/756 |
| 2018/0052878 A1* | 2/2018 | Seetharaman | G06F 16/2322 |
| 2018/0052898 A1* | 2/2018 | Allan | G06F 8/4452 |
| 2018/0165586 A1* | 6/2018 | Saxena | G06N 20/20 |
| 2018/0195926 A1* | 7/2018 | Barker | E03B 7/07 |
| 2019/0303541 A1 | 1/2019 | Reddy et al. | |
| 2020/0341957 A1* | 10/2020 | Richards | G06F 16/116 |

OTHER PUBLICATIONS

Written Opinion of the International Searching Authority, dated Apr. 8, 2021, from corresponding International Application No. PCT/US2021/012795.

* cited by examiner

SYSTEMS AND METHODS FOR TRACKING DATA LINEAGE AND RECORD LIFECYCLE USING DISTRIBUTED LEDGERS

RELATED APPLICATIONS

This application claims priority to, and the benefit of, U.S. Provisional Patent Application Ser. No. 62/958,586, filed Jan. 8, 2020, the disclosure of which is hereby incorporated by reference in its entirety.

BACKGROUND OF THE INVENTION

1. Field of the Invention

Embodiments generally relate to system and methods for tracking data lineage and record lifecycle using distributed ledgers.

2. Description of the Related Art

In general, to trace data in motion between applications, a considerable amount of manual effort is required. This is necessary to meet various regulatory requirements and to understand the impact of legislation, such as the European Union's GDPR, California's Consumer Privacy Act of 2018 (CCPA), etc. Much of the activity that is required to define the data flows between systems involves asking responsible individuals to declare what they know about inbound/outbound data flows, which can lead to low data quality as many application team members do not have a complete picture or experience of all data flows. This exercise will also have to be repeated regularly to keep data provenance evergreen.

SUMMARY OF THE INVENTION

Systems and methods for tracking data lineage and record lifecycle using a distributed ledger are disclosed. In one embodiment, a method for tracking record lifecycle events may include: (1) creating, by a record lifecycle tool, a recordable artifact for a record lifecycle event in a record lifecycle, the recordable artifact comprising data for the record lifecycle event; (2) generating, by the record lifecycle tool, a hash of the data; (3) creating, by the record lifecycle tool, record lifecycle event metadata for the recordable artifact; (4) signing, by the record lifecycle tool, the record lifecycle event metadata; (5) writing the record lifecycle event metadata to supply chain metadata storage at a storage location, wherein the supply chain metadata storage may be cryptographically verifiable and immutable; and (6) writing the hash and an identifier for the storage location in the supply chain metadata store to a present state database.

In one embodiment, the record lifecycle event may include creating a record requirement with record definition in a logical data model, committing a physical data store build script in a source code management tool, capturing a record into a system of record application, completing a data store deployment build, completing a data quality test, distributing data to a data store through a batch job, archiving data, purging a record, etc.

In one embodiment, the recordable artifact may include an identifier for an element in a supply chain associated with the record lifecycle event, a record instance identifier, a record of a data store deployment, an identifier for a data quality test exception, etc.

In one embodiment, the hash of the data may include a hash of a reference to the data.

In one embodiment, the record lifecycle event metadata may include a name for the recordable artifact, an organization identifier, a creation time, a recordable artifact type, recordable artifact data, the hash, a reference to the hash, an identifier for the record lifecycle tool, a list of supply chain elements, a reference to a prior record lifecycle event, etc.

In one embodiment, the supply chain metadata store may include immutable queues, hashgraphs, blockchain-based systems, stream processing services, NoSQL databases, relational databases, etc.

In one embodiment, the present state database may be a key/value pair database.

According to another embodiment, a method for retrieving a data lineage for a record instance may include: (1) receiving, at a user interface, a query for a lineage for a record instance; (2) generating a hash of the record instance; (3) querying a present state database for the hash; (4) receiving, from the present state database, at least one storage location in a supply chain metadata store associated with the hash; and (5) retrieving, from the supply chain metadata store, metadata from the at least one storage location.

In one embodiment, the present state database may be a key/value pair database.

In one embodiment, the at least one storage location may include a block in a blockchain-based system.

In one embodiment, the record instance may be for a record lifecycle event.

In one embodiment, the lineage may include at least of upstream and downstream lineage for the record instance.

In one embodiment, the method may further include retrieving underlying data for the metadata from a system of record.

According to another embodiment, a system for tracking record lifecycle events may include: a source of a record event; a supply chain metadata store that may be cryptographically verifiable and immutable; a present state database comprising a key/value pair database; and a record lifecycle tool that receives data for the record lifecycle event in a record lifecycle from the source of the record event, creates a recordable artifact for the record lifecycle event, generates a hash of the data, creates record lifecycle event metadata for the recordable artifact, signs the record lifecycle event metadata, writes the record lifecycle event metadata to the supply chain metadata storage at a storage location, and writes the hash and an identifier for the storage location in the supply chain metadata store to the present state database.

In one embodiment, the record lifecycle event may include creating a record requirement with record definition in a logical data model, committing a physical data store build script in a source code management tool, capturing a record into a system of record application, completing a data store deployment build, completing a data quality test, distributing data to a data store through a batch job, archiving data, purging a record, etc.

In one embodiment, the recordable artifact may include an identifier for an element in a supply chain associated with the record lifecycle event.

In one embodiment, the hash of the data may include a hash of a reference to the data.

In one embodiment, the record lifecycle event metadata may include a reference to a prior record lifecycle event.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for tracking data lineage using distributed ledgers.

In embodiments, distributed ledger technology, such as Blockchain-based technology, may be used to provide a trusted audit of data flows. This may provide a data watermark across application interfaces. The level of detail in the data watermark may depend, for example, on what is treated as a product, and what is treated as raw material for a record.

In one embodiment, each product (e.g., a software application) may be associated with a unique identifier (e.g., a universally unique identifier, or UUID), and, using this unique identifier, the data history may be retrieved by querying the unique ID.

Figure 1:
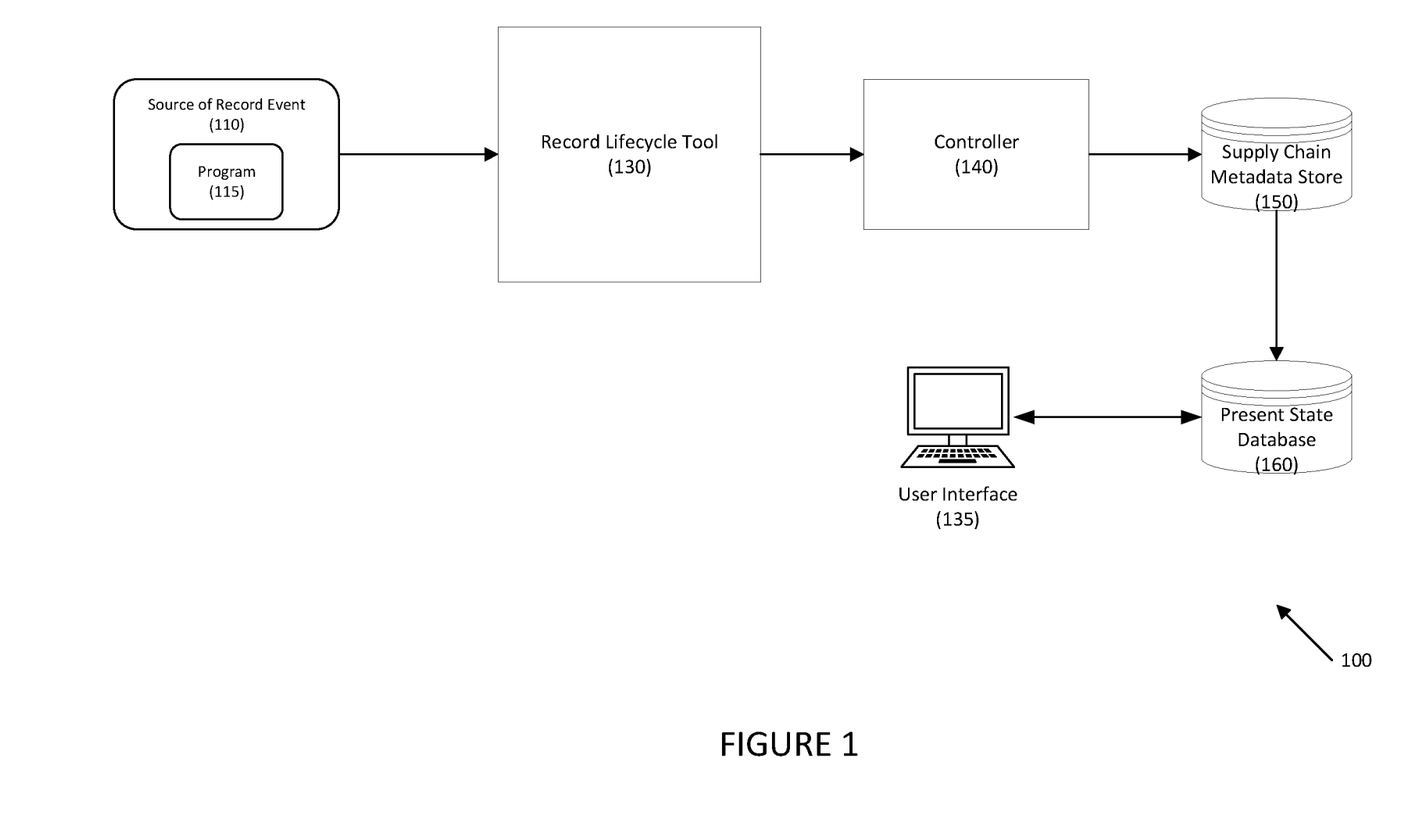
FIG. 1 depicts a system for tracking data lineage and record lifecycle using distributed ledgers according to one embodiment.

Referring to FIG. 1, a system for tracking data lineage and record lifecycle using distributed ledgers is disclosed according to one embodiment. System 100 may include one or more record sources 110, such as systems of records, database, software management systems, etc. Each record source 110 may execute program 115 that may capture metadata for record lifecycle events. Examples of record lifecycle events include, for example, creating a record requirement with record definition in a logical data model; committing a physical data store build script in a source code management tool; capturing a record into a system of record application, a data store deployment build; the completion of a data quality test, the distribution of data to another data store through a batch job, archiving to cheaper storage or purge of a record after the retention period has elapsed, etc. The record lifecycle event that are traced may be dependent on the use case of the supply chain data.

Source 110 may interface with one or more record lifecycle tool 130. Record lifecycle tool 130 may be executed by one or more servers, in the cloud, by a combination of servers and the cloud, etc. Record lifecycle tool 130 generate metadata artifacts on the record lifecycle event metadata captured by program 115. For example, a metadata artifact may include an artifact name, an organization id, a creation time (e.g., UTC), an artifact type, artifact data, an artifact hash, a reference of hash, a reference ID of record lifecycle tool, a list of supply chain references, etc.

In addition, a metadata artifact may further include some or all of the underlying data in the business record, depending on what is practical/safe to store versus what is desirable to query in the metadata repositories. In a stripped-down implementation, a universally unique identifier (UUID) for a record may be found in a database for an application. For example, if more record data was desired to be submitted to supply chain metadata store 150 to enable features such as quick location of all customer data, then more sensitive business data may be included in the metadata artifact with appropriate risk controls. These may be submitted as explicit metadata structured properties or into comment/tag fields to enable direct querying through present state database 160.

In one embodiment, record lifecycle tool 130 may encrypt the metadata artifacts with a private key, and may provide the encrypted metadata artifacts to controller 140. Controller 140 may decrypt the metadata artifacts and may write the metadata artifacts to supply chain metadata store 150, which may be a cryptographically verifiable and immutable database, such as a blockchain-based system. In an embodiment, controller 140 may further write a hash of the metadata artifacts with a reference to the location of the data in supply chain metadata store 150, such as a block identifier for a blockchain, to present state database 160. In another embodiment, the hash may be written by a batch process that may be run hourly, daily, on demand, etc.

If there are related blocks in supply chain metadata store 150, those blocks may be referenced to "link" or associate the blocks with each other. For example, a block may include a hash and reference to previous artifact hashes to link the blocks. Other manners of linking the blocks may be used as is necessary and/or desired.

User interface 135 may provide an interface for a user, an external system, etc. to query supply chain metadata store 150 and/or present state database 160.

Figure 2:
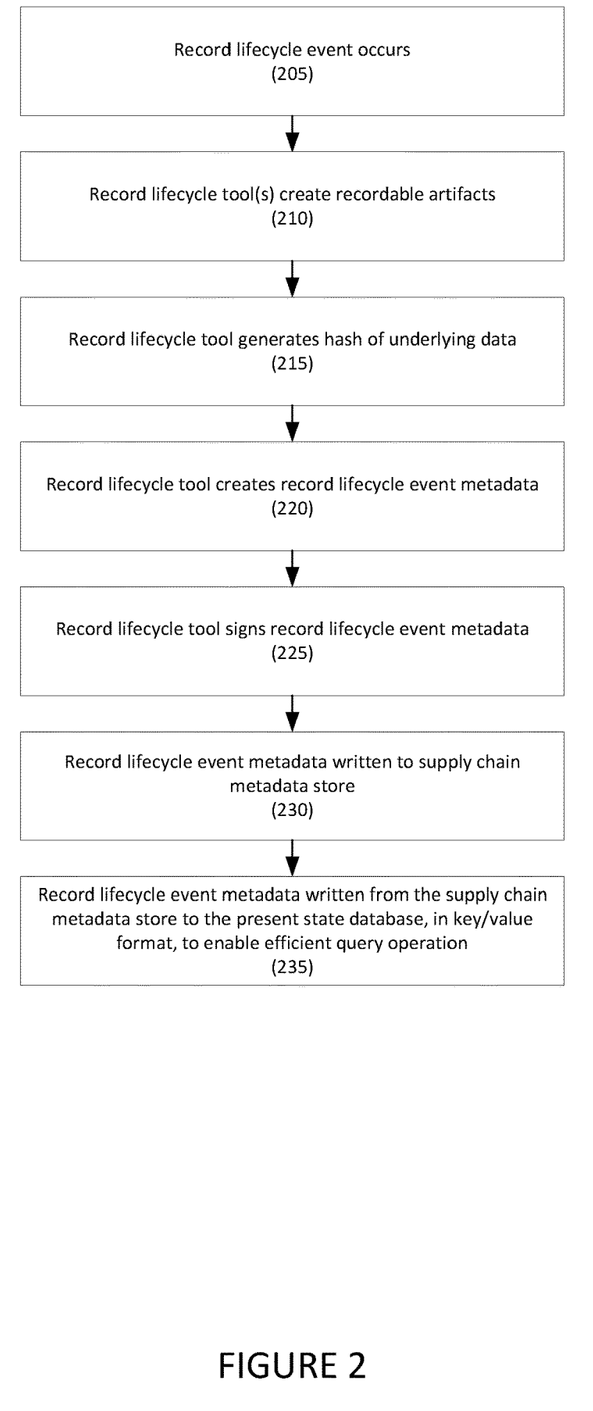
FIG. 2 depicts a method for writing data lineage to a distributed ledger and a present state database according to one embodiment.

Referring to FIG. 2, an exemplary method for writing data lineage to a distributed ledger and a present state database according to one embodiment is provided according to one embodiment.

First, in step 205, a record lifecycle event in the record lifecycle may occur. Examples of record lifecycle events may include, for example, creating a record requirement with record definition in a logical data model; committing a physical data store build script in a source code management tool; capturing a record into a system of record application; deploying of a data store build; completion of a data quality test; distributing data to another data store through a batch job; archiving data to cheaper storage; purging a record after the retention period has elapsed, etc. The record lifecycle events that are traced may be dependent on the use case of the supply chain data.

In one embodiment, a computer program may capture data for the record lifecycle event.

In step 210, a record lifecycle tool may generate one or more recordable artifacts in response to the lifecycle event. This may involve, for example, creating a record instance identifier, such as a primary key of a database table being created, creating a record of a data store deployment, creating an identifier for a data quality test exception, etc. The amount of data in the metadata artifact may be small. For larger artifacts, such as binary files, build bill of materials, data models or detailed data quality test results, a reference to the original data may be included in the artifact.

Each record lifecycle tool may also supply a list of references to elements from in the supply chain that were involved in the record lifecycle event and/or the generation of the recordable artifact. Examples include references to logical or physical data models, source code commits, upstream records where data has been used a reference material for a new record type, etc. In one embodiment, the record instance identifier hash may be the only reference necessary to link the data in the tool chain.

In step 215, the record lifecycle tool may also produce a hash of the underlying data and/or a reference to that data so that the data may be later verified. For some systems, such as Git source code control, existing tools may provide sufficient integrity checking such that a Git commit id with a reference to the source of the record lifecycle event may be sufficient. Other tools may create a hash of all the data using an appropriate mechanism, such as a Merkle tree.

In step 220, the record lifecycle tool may create record lifecycle event metadata. Exemplary record lifecycle event metadata may include, for example, recordable artifact name, organization id, creation time (e.g., UTC), recordable artifact type, recordable artifact data, the hash of the underlying data, a reference to the hash, a reference id of record lifecycle tool, list of supply chain elements involved, etc.

Additional, different, or less metadata may be used depending on the use cases or can be provided as part of the recordable artifacts themselves. In one embodiment, the metadata may not include the recordable artifacts themselves but only references to the recordable artifacts; the recordable artifacts may be maintained within the original tool or separate recordable artifact repositories. The metadata may uniquely identify the recordable artifacts.

In step 225, the record lifecycle tool may sign the record lifecycle event metadata. For example, each record lifecycle tool may have a certificate chain to identify the record lifecycle tool and may use a public/private pair key used to encrypt and decrypt the metadata. Each record lifecycle tool may have certificates that may change over time. How and when certificates are changed may be dependent on the requirements of the overall system. Certificates may be generated from a trusted source where used.

Signing the record lifecycle event metadata using certificates does not preclude attaching data to the supply data chain in the supply chain metadata store. The interpretation of unsigned data may be the responsibility of the systems viewing the data. For example, an automated approval system may not approve a deployment from an unknown source depending on the environment, or a compliance tool may raise an exception against a tool that is not known. However, if the metadata store is permissioned then unsigned artifacts may not be accepted.

Once generated, the record lifecycle event metadata can be made available.

In step 230, the record lifecycle event metadata may be written to the supply chain metadata store at a storage location (e.g., a block). The supply chain metadata store is the ultimate source of the reference data, and may be immutable with limited access to updating (e.g., only by a supply chain controller). The supply chain metadata store may be a single metadata store, or it may be multiple stores.

The supply chain metadata store may include, for example, immutable queues, hashgraphs, blockchain-based systems, stream processing services, NoSQL database, conventional relational databases, etc. In embodiments, the store may be immutable and be able to verify the data used.

The supply chain metadata store may be permissioned and private, or it may be public and un-permissioned depending on the underlying technologies used.

In one embodiment, the record lifecycle event metadata may be linked or otherwise associated with a prior submission or event for the same project.

In embodiments, the record lifecycle event metadata may be provided to a supply chain controller that writes the data. In embodiments, the controller may abstract the supply chain metadata store from the actual storage technology. This allows each lifecycle tool to write data without having to understand or implement the underlying storage technology; control access to the supply chain metadata store in a permissioned system and to enforce any policy rules such as not accepting unsigned data or data signed from unknown source; check whether the data already exists; and create the transaction to be written to the underlying metadata store.

The record lifecycle event metadata may be backed up and retained for as long as required for the underlying use cases.

In step 235, record lifecycle event metadata may be written to a database, such as a present state database, along with an identifier (e.g., a block identifier) for the storage location in the supply chain metadata store. The present state database may be a key/value pair highly scalable database where each key is a value of the metadata stored and provides a reference to the underlying data source record. The present state database may provide a simplified search of the underlying metadata store for the users of the data.

The present state database may be reconstructed entirely from the underlying supply chain metadata store. As such, it may be updated from the supply chain controller directly, or it may be created as part of an event to the supply chain metadata store depending on the use case.

Figure 3:
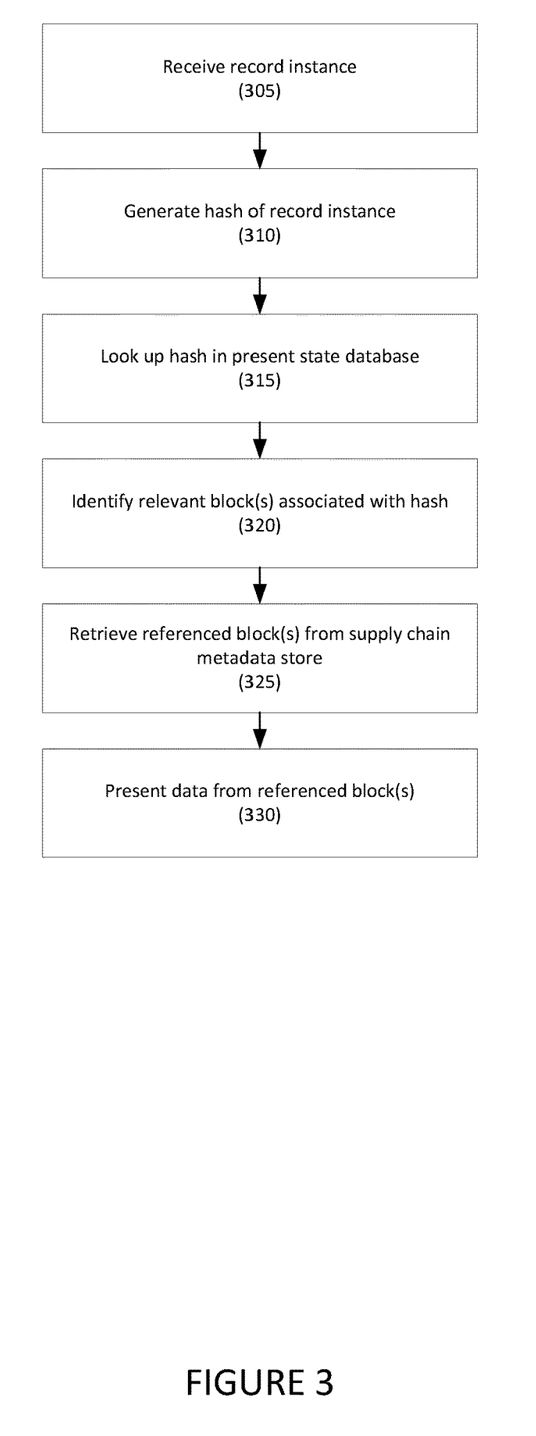
FIG. 3 depicts a method for querying a present state database and retrieving data lineage in response to a query according to one embodiment.

Referring to FIG. 3, a method for querying a present state database and retrieving data lineage in response to a query is disclosed according to one embodiment. In step 305, a user or system may submit a query involving a record instance. In one embodiment, the query may be received from an electronic device, a terminal, a system, etc.

Examples of record instances may include contract agreement records, client identifiers, regulatory reports, etc. Other forms of data which, depending on if the identifiers or the full composition of data items that make up the record, instance may be treated as a product which may be traced.

In step 310, a hash of the record instance may be generated, and, in step 315, the present state database may be searched for the hash.

In embodiments, the absence of match may not indicate an error, as the artifact may exist outside the traced records. For example, some records may predate the implementation of the system, and would then not have a match. Thus, this may be treated as an exception that may require onboarding in retrospect. In other embodiment, additional attempts may be made to find a match by inspecting other features or decomposed pieces of the record to find identifiers within a full data set.

In step 320, one or more blocks associated with the hash of the record instance may be identified in the present state database, and, in step 325, the identified blocks may be retrieved from the supply chain metadata store.

In one embodiment, the blocks may be identified by matching other features as is necessary and/or desired.

In step 330, one or more of the identified blocks may be presented, and the upstream and/or downstream lineage may be presented as is necessary and/or desired. In one embodiment, the underlying record associated with the artifact may be retrieved and presented. For example, deployment servers may be identified, source code may be retrieved, record physical structures may be retrieved, etc., and hosts, files, physical elements, attributes, etc. associated therewith may be presented.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for tracking record lifecycle events, comprising:
   creating, by a record lifecycle tool, a recordable artifact for a record lifecycle event in a record lifecycle, the recordable artifact comprising data for the record lifecycle event and an identifier for an element in a supply chain associated with the record lifecycle event;
   generating, by the record lifecycle tool, a hash of the data;
   creating, by the record lifecycle tool, record lifecycle event metadata for the recordable artifact, the record lifecycle event metadata comprising a list of supply chain elements that comprises at least a recordable artifact type and an indication of an upstream record that used the data as a reference material for a different recordable artifact type;
   signing, by the record lifecycle tool, the record lifecycle event metadata;
   writing the signed record lifecycle event metadata to a supply chain metadata store at a storage location, wherein the supply chain metadata store is cryptographically verifiable and immutable; and
   writing the hash and an identifier for the storage location in the supply chain metadata store to a present state database.

2. The method of claim 1, wherein the record lifecycle event comprises at least one of creating a record requirement with record definition in a logical data model, committing a physical data store build script in a source code management tool, capturing a record into a system of record application, completing a data store deployment build, completing a data quality test, distributing data to a data store through a batch job, archiving data, and purging a record.

3. The method of claim 1, wherein the recordable artifact comprises at least one of a record instance identifier, a record of a data store deployment, and an identifier for a data quality test exception.

4. The method of claim 1, wherein the hash of the data comprises a hash of a reference to the data.

5. The method of claim 1, wherein the record lifecycle event metadata comprises at least one of a name for the recordable artifact, an organization identifier, a creation time, recordable artifact data, the hash, a reference to the hash, and an identifier for the record lifecycle tool.

6. The method of claim 1, wherein the record lifecycle event metadata comprises a reference to a prior record lifecycle event.

7. The method of claim 1, wherein the supply chain metadata store comprises at least one of immutable queues, hashgraphs, blockchain-based systems, stream processing services, NoSQL databases, and relational databases.

8. The method of claim 1, wherein the present state database comprises a key/value pair database.

9. A method for retrieving a data lineage for a record instance, comprising:
- receiving, at a user interface, a query for a lineage for a record instance, the record instance comprising data for a record lifecycle event and an identifier for an element in a supply chain associated with the record lifecycle event;
- generating a hash of the record instance;
- querying a present state database for the hash;
- receiving, from the present state database, at least one storage location in a supply chain metadata store associated with the hash; and
- retrieving, from the supply chain metadata store, metadata from the at least one storage location, the metadata comprising a list of supply chain elements that comprises at least a recordable artifact type and an indication of an upstream record that used the data as a reference material for a different recordable artifact type.

10. The method of claim 9, wherein the present state database comprises a key/value pair database.

11. The method of claim 9, wherein the at least one storage location comprises a block in a blockchain-based system.

12. The method of claim 9, wherein the lineage comprises downstream lineage for the record instance.

13. The method of claim 9, further comprising:
- retrieving underlying data for the metadata from a system of record.

14. A system for tracking record lifecycle events, comprising:
- a source of a record event;
- a supply chain metadata store that is cryptographically verifiable and immutable;
- a present state database comprising a key/value pair database; and
- a record lifecycle tool that receives data for the record lifecycle event in a record lifecycle from the source of the record event, creates a recordable artifact for the record lifecycle event, generates a hash of the data, creates record lifecycle event metadata for the recordable artifact, signs the record lifecycle event metadata, writes the signed record lifecycle event metadata to the supply chain metadata store at a storage location, and writes the hash and an identifier for the storage location in the supply chain metadata store to the present state database,
- wherein the recordable artifact comprises the data for the record lifecycle event and an identifier for an element in a supply chain associated with the record lifecycle event, the element comprising at least a recordable artifact type and an indication of an upstream record that used the data as a reference material for a different recordable artifact type.

15. The system of claim 14, wherein the record lifecycle event comprises at least one of creating a record requirement with record definition in a logical data model, committing a physical data store build script in a source code management tool, capturing a record into a system of record application, completing a data store deployment build, completing a data quality test, distributing data to a data store through a batch job, archiving data, and purging a record.

16. The system of claim 14, wherein the hash of the data comprises a hash of a reference to the data.

17. The system of claim 14, wherein the record lifecycle event metadata comprises a reference to a prior record lifecycle event.

* * * * *